United States Patent [19]

Endo et al.

[11] 3,920,111

[45] Nov. 18, 1975

[54] AUTOMOTIVE BUMPER ARRANGEMENT

[75] Inventors: Toshiaki Endo, Yokosuka; Masateru Takao; Nobuhiro Abe, both of Yokohama; Shuhei Wakita, Fujisawa; Haruo Kamata, Kamakura, all of Japan

[73] Assignee: Nissan Motor Company, Limited, Japan

[22] Filed: Dec. 5, 1973

[21] Appl. No.: 421,854

[30] Foreign Application Priority Data

Dec. 9, 1972  Japan............................. 47-141402

[52] U.S. Cl. ...................... 293/97; 293/64; 293/88
[51] Int. Cl.² ........................................ B60R 19/04
[58] Field of Search ............ 293/63, 64, 71 R, 71 P, 293/78, 81, 88, 97, 70, 98

[56] References Cited
UNITED STATES PATENTS

| | | | |
|---|---|---|---|
| 2,062,315 | 12/1936 | Jandus et al. | 293/71 R |
| 2,874,669 | 2/1959 | Norman | 293/71 R |
| 2,893,776 | 7/1959 | Earl | 293/64 |
| 3,068,041 | 12/1962 | Barényl | 293/71 R |
| 3,326,590 | 6/1967 | Wilfert | 293/81 |
| 3,680,903 | 8/1972 | Hulten | 293/71 R |
| D125,009 | 2/1941 | Walker | 293/98 |

FOREIGN PATENTS OR APPLICATIONS 711,222   8/1941   Germany ............................ 293/88

*Primary Examiner*—Evon C. Blunk
*Assistant Examiner*—Robert Saifer
*Attorney, Agent, or Firm*—Robert E. Burns; Emmanuel J. Lobato; Bruce L. Adams

[57] ABSTRACT

A bumper arrangement which consists of a shock-absorbing bumper positioned at a legally determined level over the ground, and a decorative member extending along the shock-absorbing bumper so as to camouflage the shock-absorbing bumper as if it were positioned at a level which is as high as a level desired from an aesthetic point of view. The bumper arrangement is conducive to achieving a balanced external appearance of the vehicle in which the height of the shock-absorbing bumper per se is dictated under local vehicle safety regulations irrespective of the size and the styling of the model and the make of the vehicle.

2 Claims, 11 Drawing Figures

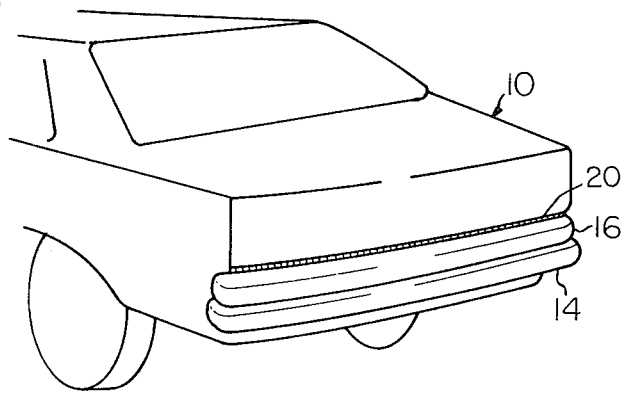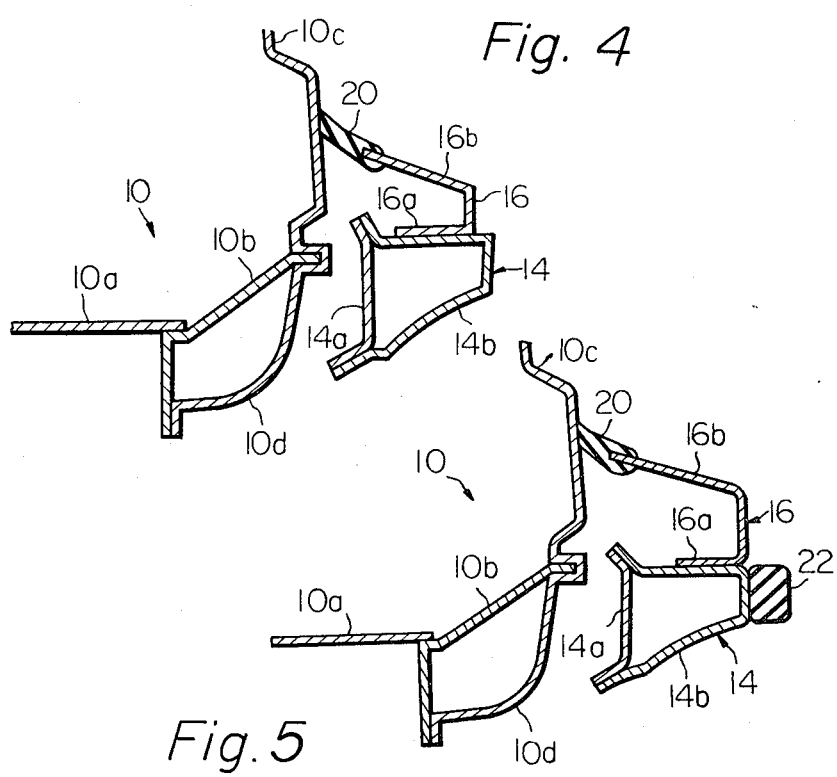

AUTOMOTIVE BUMPER ARRANGEMENT

The present invention relates to bumper arrangements for automotive vehicles and, more particularly, to an automotive bumper arrangement which serves in part for shock absorbing purposes as usual and in part for decorative purposes.

Neither established standard nor official regulations were available for the heights of automotive bumpers from the ground level. The heights of the bumpers over the ground were thus determined on individual models and makes of the automotive vehicles depending primarily on the desired styling designs of the vehicles. When, therefore, a vehicle comes into collision with another vehicle which differs in size from the former, it sometimes happens that the body structures of both vehicles are brought into direct contact with each other and are accordingly subjected to violent shocks because the bumpers of the vehicles are vertically not aligned with each other.

Local vehicle safety regulations have therefore been set up so that the heights of the automotive bumpers over the ground level are standardized whereby the impacts resulting from a bumper-to-bumper collision of automotive vehicles can be absorbed solely by the bumpers. Such regulations have imposed limitations on the selection of the styling of the automotive vehicles because the bumpers must be mounted at a certain legally determined level over the ground irrespective of the sizes, makes and models of the vehicles.

An object of the present invention is to provide an automotive bumper arrangement which is adapted to alleviate such limitations imposed on the styling designs of the vehicle and which is nevertheless capable of fully meeting the regulations concerning the height of the bumper over the ground.

In accordance with the present invention, there is provided a bumper arrangement which comprises, in combination, a shock-absorbing bumper positioned at a certain level from the ground and a decorative member positioned adjacent and in parallel to the shock-absorbing bumper. The shock-absorbing bumper may have its outer end projecting outwardly of the outer end of the decorative member so as to be brought into direct contact with the bumper of another vehicle during collision. Or otherwise, the outer end of the shock-absorbing bumper may be flush with or inwardly withdrawn from the outer end of the decorative member. In this instance, the bumper arrangement further comprises at least one resilient member which is attached to the outer end of the shock-absorbing bumper and projects outwardly of the outer end of the decorative member.

The term "outer end" as herein used is meant to refer to the particular relative position of the bumper in a fore-and-aft direction of the vehicle body. The "outer end" of the bumper, is, accordingly, intended to refer to the front end of the bumper when mentioned in conjunction with the front bumper arrangement and to the rear end of the bumper when mentioned in conjunction with the rear bumper arrangement. The terms "outwardly" and "inwardly" as also used herein in connection with the position of the shock-absorbing bumper relative to the decorative member should be construed accordingly.

The features and advantages of the automotive bumper arrangement according to the present invention will become more apparent from the following description taken in connection with the accompanying drawings in which like reference numerals designate corresponding parts throughout the figures and in which:

FIG. 3 is a fragmentary perspective view showing an external appearance of a bumper arrangement which is proposed by the present invention;

FIG. 4 is a cross sectional view of a first preferred embodiment of the bumper arrangement according to the present invention;

FIG. 5 is a cross sectional view of a second preferred embodiment of the bumper arrangement according to the present invention;

Figure 1:
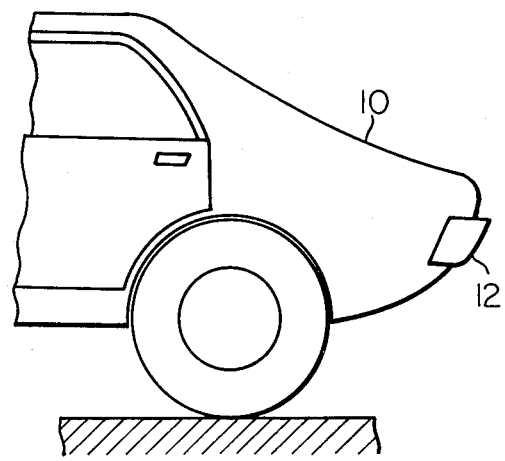
FIGS. 1 and 2 are fragmentary side elevational views showing examples of automotive vehicles equipped with prior art bumpers.
Figure 2:
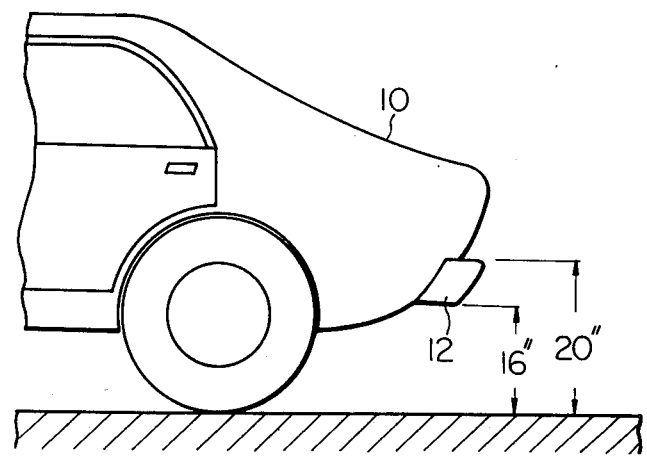

As previously mentioned, a wide variety of selection was allowed of the vertical positions of the bumpers of automotive vehicles depending upon the sizes, models and makes of the vehicles in the past when no legal regulations were in force. In an automotive vehicle of, for example, the so-called "hip-up" type which has a raised rear body styling as indicated by 10 in FIG. 1, meticulous consideration used to be paid in selecting the position of the rear bumper 12 relative to the rear body 10 so as not to aesthetically impair the external appearance of the vehicle as a whole. The selection of the relative position of the bumper is, however, now critically narrowed by the legal vehicle safety regulations which impose requirements on the height of the bumper over the ground level. In accordance with one local regulation which is presently in force, it is required that the bumper have a lower end spaced 16 inches apart from the ground level and an upper end spaced 20 inches apart from the ground level, as indicated in FIG. 2. To meet such requirements in automotive vehicles of relatively small sized types or in particular of the previously mentioned "hip-up" type having the raised rear body structures, it is inevitable that the bumpers be positioned at a level more or less lower than the levels which are desired to achieve balanced external appearances of the vehicles, as will visually be understood from comparison between the bumper positions indicated in FIGS. 1 and 2.

To solve these problems, the present invention proposes a new and useful bumper arrangement which generally consists, as seen in FIG. 3, of a combination of a shock-absorbing bumper 14 and a dummy or decorative member 16 extending adjacent to and in parallel to the shock-absorbing bumper 14. The shock-absorbing bumper 14 is vertically positioned so as to meet the local regulations governing the height of the bumper and has, under the regulations, a lower end located at a level of 16 inches over the ground and an upper end located at a level of 20 inches over the ground. The dummy or decorative member 16 may be positioned either upwardly or downwardly of the shock-absorbing bumper 14 depending upon the size of the vehicle on which the bumper arrangement according to the present invention is to be mounted. In a vehicle of the relatively small sized type or of the "hip-up" type in which the shock-absorbing bumper 14 is usually positioned at a level lower than the levels which are desired from the aethetic point of view, the decorative member 16 should be positioned upwardly of the shock-absorbing bumper 14 so as to camouflage the shock-absorbing bumper as if it were located higher than actual.

Figure 8:
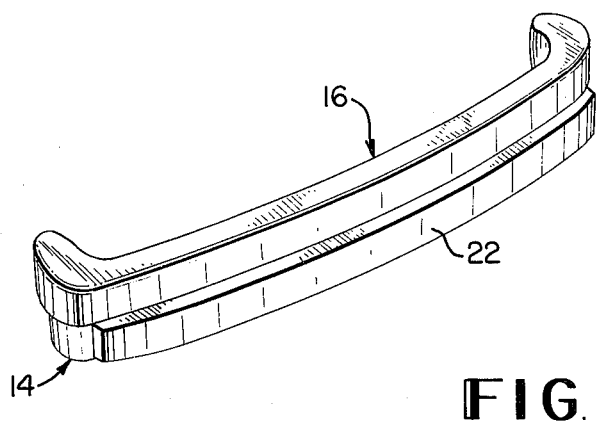
FIG. 8 is a perspective view showing a resilient strip extended substantially throughout the length of shock-absorbing bumpers.
Figure 9:
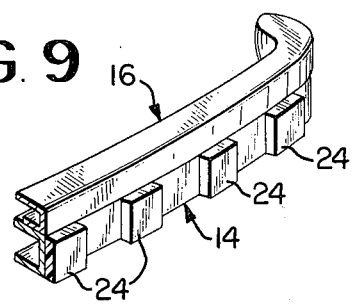
FIG. 9 is a fragmentary perspective view showing a shock-absorbing bumper having an outer end which is substantially flush with an outer end of a decorative member.
Figure 10:
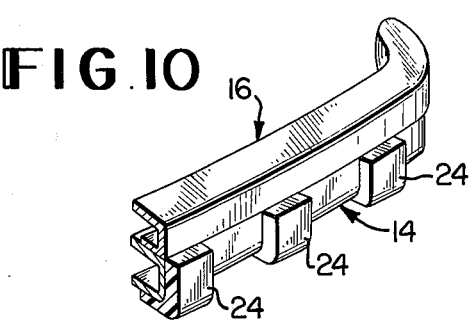
FIG. 10 is a fragmentary perspective view showing resilient members attached to the outer end and lower end of a shock-absorbing bumper.
Figure 11:
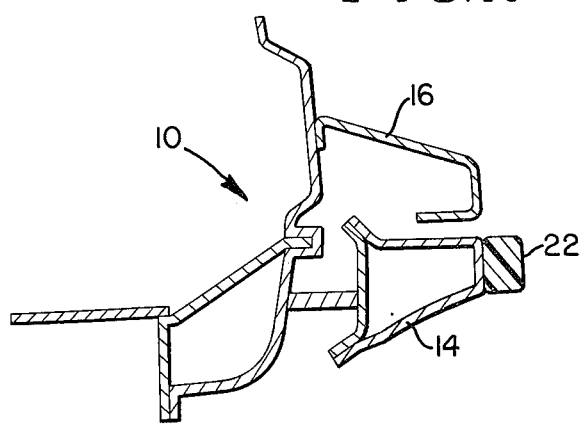
FIG. 11 is a cross-sectional view of a fourth bumper arrangement according to the invention.

FIG. 4 illustrates a first preferred embodiment of the bumper the general constructional features of which are shown in FIG. 3. The bumper arrangement herein shown is assumed as mounted on the rear body structure of the vehicle body 10 which comprises, as is customary, a rear floor panel 10a, a rear cross member 10b, a rear upper member 10c and a rear lower panel 10d. The shock absorbing bumper 14 comprises an inner bumper member 14a connected through usual bumper stays (not shown) or any cushioning means to the rear body structure 10 and an outer bumper member 14b which is welded or otherwise fastened to the inner bumper member as customary. The decorative member 16, on the other hand, has a lower lateral portion 16a which is welded or otherwise fastened to the outer bumper member 14b of the shock-absorbing bumper 14 and an upper lateral portion 16b which is connected to the rear body structure 10 or, more particularly, to the rear upper panel 10c thereof through suitable cushioning means such as for example an elongated strip 20 of resilient material. The strip 20 serves not only to resiliently support the decorative member 16 but, where the strip 20 extends throughout the length of the decorative member 16, serves to provide sealing between the bumper 16 and the rear upper panel 10c. The outer bumper member 14b of the shock-absorbing bumper 14 is, in the shown embodiment, so arranged that the outer or rear end of the outer bumper member 14b projects outwardly or rearwardly of the outer or rear end of the decorative member 16 whereby an impact applied to the vehicle in the event of collision is prevented from being directly imparted to the decorative member 16. Where desired, however, the outer bumper member 14b of the shock-absorbing bumper 14 may be arranged to be substantially flush at its outer or rear end with the outer or rear end of the decorative member 16 as shown in FIG. 5, 9 and 10 which shows a second preferred embodiment of the present invention. In this instance, an elongated strip 22 of resilient material is attached to the outer or rear end of the outer bumper member 14b of the shock-absorbing bumper 14 so that the outer or rear end of the decorative member 16 is located at a position withdrawn inwardly of the resilient elongated strip 22. The resilient strip 22 may extend throughout the length of the shock-absorbing bumper 14 (as shown in FIG. 8) or may be attached to only a limited longitudinal portion of the outer bumper member 14b of the shock-absorbing bumper 14.

Figure 6:
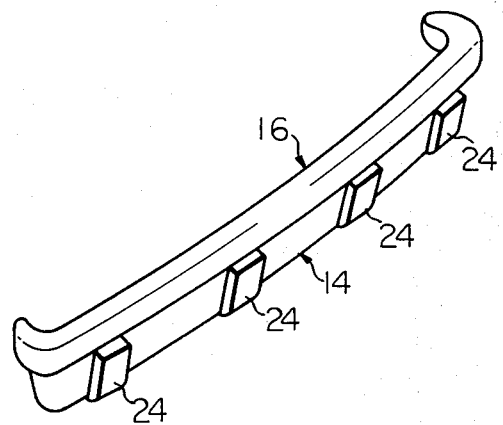
FIG. 6 is a perspective view showing a third preferred embodiment of the bumper arrangement according to the present invention.
Figure 7:
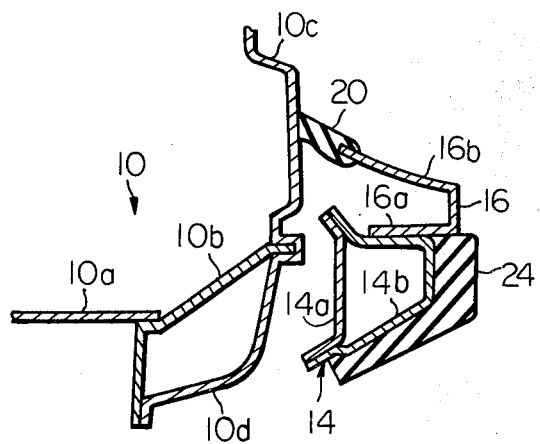
FIG. 7 is a cross sectional view of the bumper arrangement illustrated in FIG. 6.

FIGS. 6 and 7 illustrate a third preferred embodiment of the bumper arrangement according to the present invention. In the bumper arrangement shown in these figures, in contrast to FIGS. 4 and 5, the outer or rear end of the outer bumper member 14b is withdrawn inwardly of the outer or rear end of the decorative member 16 and a plurality of spaced resilient members 24 are attached to the outer or rear end and the lower end of the outer bumper member 14b of the shock-absorbing bumper 14. Each of the resilient members 24 has at least at its portion attached to the outer or rear end of the outer bumper member 14b a thickness which is selected to enable the resilient member to protrude outwardly or rearwardly of the outer or rear end of the decorative member 16 as illustrated. While the outer bumper member 14b of the shock-absorbing bumper 14 of the embodiment shown in FIGS. 4 or 5 may provide a more or less massive and outstanding appearance, the shock-absorbing bumper 14 in the embodiment of FIGS. 6 and 7 will be conducive to elimination of such a massive and outstanding appearance because the bumper 14 is retracted behind the protruded end of the decorative member 16.

To enhance the camouflaging effect achieved of the decorative member 16 in any of the embodiments thus far described, the shock-absorbing bumper 14 may be painted, coated or plated over its exposed surfaces to a color which is less contrasting than the color of the exposed surfaces of the decorative member.

It may be noted, moreover, that although the embodiments of the bumper arrangement according to the present invention have thus far been described and shown as applied to the rear body structure of the vehicle such are merely for purposes of illustration only and can thus be applied also to the front body structure of the vehicle.

What is claimed is:

1. A bumper construction for an automotive vehicle, comprising; a shock-absorbing bumper, installable at a level above the ground which suits the safety of a vehicle, to extend across a relatively raised rear end section of the vehicle; means for balancing the external appearance of the vehicle, comprising a decorative member installable along and adjacent said bumper, to extend across said end section, said decorative member having a lower surface secured to an upper surface of said bumper; and a strip of resilient material secured to an edge of said decorative member and securable to said end section of the vehicle.

2. A bumper construction for an automotive vehicle, comprising; a shock-absorbing bumper, installable at a level above the ground which suits the safety of a vehicle, to extend across an end section of the vehicle; means for balancing the external appearance of the vehicle, comprising a decorative member installable along and adjacent said bumper, to extend across 67 the end section, said decorative member having an outer end which is substantially flush with an outer end of said bumper; and a plurality of spaced resilient members attached to the other end of said shock-absorbing bumper and which project outwardly of the outer end of said decorative member.

* * * * *